Figure 1:
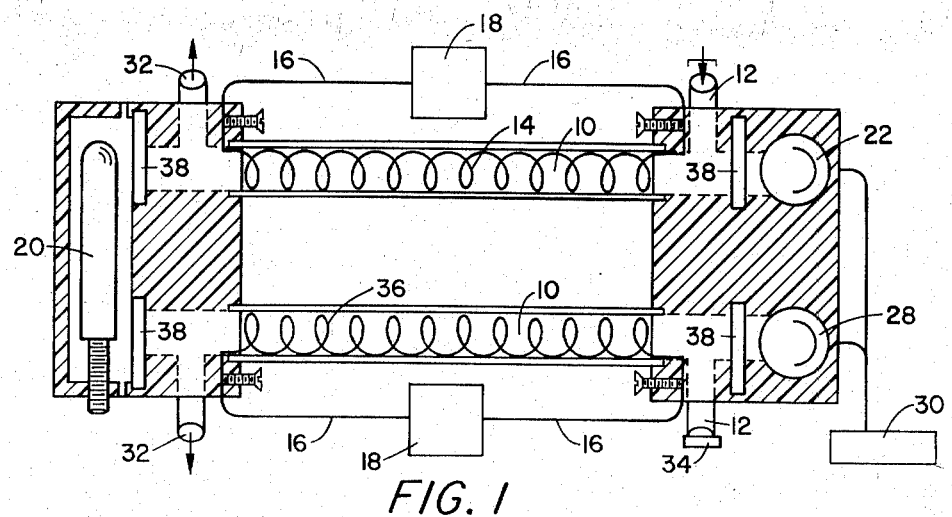

United States Patent [19]

Gant et al.

[11] 3,778,162

[45] Dec. 11, 1973

[54] APPARATUS FOR THE COLLECTION AND MEASUREMENT OF THE AMOUNT OF MERCURY VAPORS PRESENT IN A VOLUME OF AIR OR OTHER GASES

[75] Inventors: Preston L. Gant; Bill G. Motes; Jerry T. Aylor, all of Ponca City, Okla.

[73] Assignee: Continental Oil Company, Ponca City, Okla.

[22] Filed: Mar. 24, 1972

[21] Appl. No.: 237,840

[52] U.S. Cl. ............... 356/51, 250/373, 356/88, 356/206, 356/85
[51] Int. Cl. ................... G01j 5/56, G01n 21/22
[58] Field of Search .............. 356/51, 85, 88, 206; 250/43.5 R, 372, 373; 55/72, 74, 387, 525

[56] References Cited
UNITED STATES PATENTS

| | | | |
|---|---|---|---|
| 2,721,942 | 10/1955 | Friel et al. | 250/43.5 R |
| 3,591,289 | 7/1971 | Donega et al. | 356/85 |
| 3,693,323 | 9/1972 | Gant | 55/72 |
| 3,560,738 | 2/1971 | Strange | 250/43.5 R |
| 3,178,572 | 4/1965 | Williston | 250/43.5 R |
| 3,281,596 | 10/1966 | Williston | 250/43.5 R |
| 3,666,362 | 5/1972 | Chance | 356/88 |

Primary Examiner—David Schonberg
Assistant Examiner—V. P. McGraw
Attorney—Joseph C. Kotarski et al.

[57] ABSTRACT

Apparatus for the collection and measurement of the amount of mercury vapors present in a volume of air or other gases. The apparatus includes a hollow chamber having a noble metal absorbent mounted therein for the absorption of mercury vapor present in gases passed therethrough, a power source connected to the absorbent for heating thereof, a light source mounted at a first end of the chamber, a first photo cell at a second end of the chamber positioned to receive a beam of light emanating from the lamp passing through the chamber, a mercury vapor reservoir adjacent the first photo cell and positioned in order that the beam of light emanating from the lamp passes through the reservoir prior to receipt thereof by the first photo cell, a second photo cell at a second end of the chamber positioned to receive a beam of light emanating from the lamp passing through the chamber without passing through the mercury vapor reservoir, a means for measuring the absorbence of the first and second photo cells and calculating the differential when the means for heating is activated, and a means for exiting the gases after the activation and measurement has been completed.

6 Claims, 3 Drawing Figures

APPARATUS FOR THE COLLECTION AND MEASUREMENT OF THE AMOUNT OF MERCURY VAPORS PRESENT IN A VOLUME OF AIR OR OTHER GASES

This invention relates to an apparatus for the collection and measurement of the amount of mercury vapors present in a volume of air or other gases. More particularly, the present invention relates to an apparatus which collects the mercury vapors present in a volume of gas passed therethrough by absorbing the mercury vapor on a noble metal absorbent and then measures the amount present by heating the noble metal absorbent to desorb the collected mercury vapor and simultaneously passing a beam of light through the desorbed mercury to separate photo cells, one of the photo cells having a mercury vapor reservoir positioned in order that the beam of light passing through the desorbed mercury must pass through the mercury vapor reservoir prior to receipt thereof by the photo cell. The photo cells are connected to a recording and calculating instrument which measures the difference in the absorbence of the photo cells which corresponds to the amount of mercury vapor present in the given volume of gas.

Many varied techniques and apparatus have been disclosed previously for the collection of mercury vapors present in a volume of air or other gases. Some of the principal mercury traps disclosed previously are those disclosed in U.S. Pat. Nos. 3,232,033; 3,281,596; 3,173,016; 3,178,572; 3,193,987, 3,374,608; 1,711,742 and 2,345,090. Also disclosed in the above-mentioned patents are various absorbent materials for the collection of mercury thereon. The principal absorbent materials disclosed therein include highly porous glass wool fibers coated with pure gold or silver, nickel fibers coated with gold, silver or other mercury wettable metals and activated carbon impregnated with metals which will amalgamate with mercury, for example, silver, copper and other metals which are not easily oxidized.

Probably the most prominent method that has been used previously for the trapping of mercury from a volume of gas is the use of silver screens as the absorbent material with the subsequent transfer of said screens to a radio frequency and induction heater coil and quickly heating the surface and sweeping the release surface mercury into an atomic absorption cell for the measurement thereof. It is also known that gold or silver foils and cylindrical tubes have been used for the trapping of mercury.

THe mercury collected by the various methods is normally measured by the absorption of the 2,537 A. (mercury resonance line) light — and quantitized by calibration with known injections of mercury vapor.

A variety of problems have arisen in the employment of the method of materials previously used in the art. Silver screens are often rendered inactive in areas of copper mineralization by surface contamination. Both gold and silver foils are soft and maleable and with significant vibration, which is found in vehicular or airborne type operations, tend to pack and consequently change trapping and heating efficiency. Further, they trap poorly at high velocities and must be calibrated often. Reproducibility is a general problem with all the previous methods and may contaminate on setting and are difficult to reactivate. A simple reproducible inexpensive mercury trap which could both collect and measure the amount of mercury vapors present in a volume of gas to get away from the need for separate traps for collecting the mercury vapor and separate measuring devices. Further, it was necessary to get away from the old type traps which used heavy induction furnaces which take lots of power and are very inefficient.

Therefore, it is an object of the present invention to provide the art with a simple efficient reproducible trap for both collecting and measuring the amount of mercury vapor present in a volume of air or gases.

Another object is to provide the art with an apparatus for the collection and measurement of mercury vapor which requires only a small amount of power for the desorption of the collected mercury on the absorbing material which allows for the use thereof in light aircraft or land vehicles.

These and other objects of the present invention will become apparent from a reading of the following detailed description taken in connection with the accompanying drawings.

Broadly described, the apparatus of the present invention comprises a hollow chamber having means for introducing gas thereinto at a first end thereof, absorbent means mounted in the chamber for the absorption of mercury vapor present in gas passed therethrough, means for connecting the absorbent means to a power source for heating thereof, a light source mounted at a second end of the chamber, a first photo cell at a first end of the chamber positioned to receive a beam of light emanating from the light source and passing through the chamber, a mercury vapor reservoir adjacent the first photo cell and positioned so that a beam of light emanating from a light source passes through the reservoir prior to receipt thereof by the first photo cell, a second photo cell at a first end of the chamber positioned to receive a beam of light emanating from a light source and passing through chamber without passing through the mercury vapor reservoir, and means for measuring the absorbence of the first and second photo cells and calculating the differential when means for heating is activated, means for exiting the gas at a second end of the chamber after the activation and measurement has been completed.

In a preferred embodiment, the apparatus includes in the reaction chamber a hollow helical-shaped resistance wire having a gold plating thereon. An ultraviolet lamp is mounted at the opposite end of the chamber from the photo cells in order that (after gas containing mercury vapor is passed into the chamber and has been absorbed on the gold plating of the wire and by activation of the power source for direct resistance heating of the wire and the mercury is desorbed) a beam of light emanating from the lamp will pass through the chamber and the mercury reservoir prior to receipt thereof by the first photo cell. The second photo cell is positioned so that the beam of light from the lamp is received by it without passing through the mercury vapor reservoir. Means is provided for measuring the absorbence of both photo cells and calculating the difference thereof, the difference in absorbence of the two photo cells representing the amount of mercury vapor present in the volume of gas. Also, means is provided for exiting of the gas upon completion of the operation.

Figure 2:
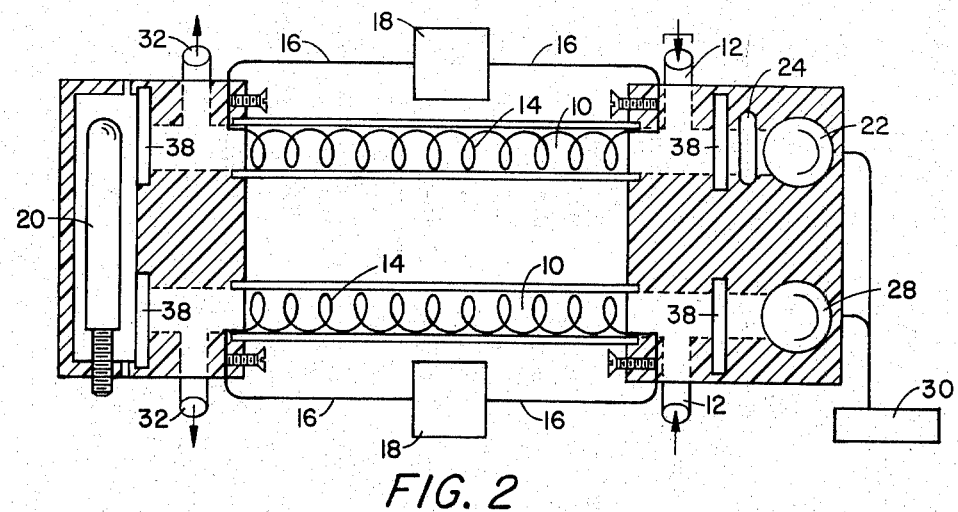
Figure 3:
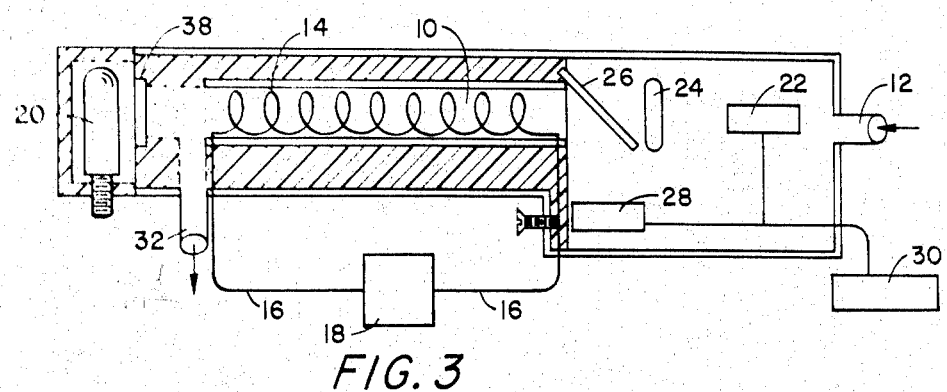

Turning to the drawings,

FIGS. 1, 2 and 3 are perspective views of various specific embodiments of the apparatus of the present invention suitable for the collection and measurement of the amount of mercury vapors present in a sample volume of air or other gases.

In the figures the numerical designations represent the same elements throughout all three, i.e. number 28 in all three figures designates the second photo cell.

In one form as illustrated in FIG. 3, the apparatus of the invention includes a hollow chamber 10 having opening 12 at a first end thereof. In the chamber 10, secured by means provided therefor, is a noble-metal plated resistance wire 14 to absorb any mercury vapor present in a volume of gas when said volume of gas is introduced through opening 12 of chamber 10. Means 16 are provided for connecting wire 14 to a power source 18 for heating of wire 14 to a temperature of above about 450°C. to release the mercury collected on the noble-metal plating of wire 14 during the passage of gas through chamber 10. A light source is mounted at a second end of chamber 10 for the passage of a beam of light therefrom through chamber 10 and the desorbed mercury vapor therein from wire 14. At a first end of chamber 10 is provided a first photo cell 22 positioned to receive a beam of light emanating from light source 20 passing through chamber 10. A mercury vapor reservoir 24 adjacent said first photo cell 22 is positioned in order that said beam of light emanating from light source 20 passing through chamber 10 passes through reservoir 24 prior to receipt thereof by first photo cell 22. A second photo cell 28 at a first end of chamber 10 is positioned to receive a beam of light emanating from light source 20 without passing through said mercury vapor reservoir 24. A half-silver mirror 26 is so positioned in chamber 10 in order to reflect one-half of the light emanating from light source 20 passing through chamber 10 to second photo cell 28 and one-half of the light to first photo cell 22 via mercury vapor reservoir 24. Chamber 10 is further provided with opening 32 for exiting of gas after the operation is completed. Means 30 is provided for measuring the absorbence of first photo cell 22 and second photo cell 28 and calculating the difference thereof when power source 18 is activated for heating wire 14. Quartz disc 38 is shown as a suitable means for sealing chamber 10 and as an aid for transmitting the beam of light from light source 20 through the chamber for receipt by the respective photo cells.

FIGS. 1 and 2 illustrate suitable forms of the apparatus of the invention employing dual chambers. FIG. 1 employing bare resistance wire 36 in conjunction with a suitable mercury filter 34 (PdCl$_2$ on glass wool, for example) in one of the chambers. FIG. 2 illustrates essentially the same apparatus illustrated by FIG. 3 except in a dual chamber assembly.

In the utilization of the apparatus of the invention for collecting and measuring the amount of mercury vapor present in a volume of gas depicted in one form by FIG. 3, a sufficient sample of gas or air is introduced through opening 12 to fill chamber 10 and the assembly is then closed. The mercury present in the sample will collect on the surface of the noble-metal plated wire 14. Power source 18 is activated to direct resistance heat wire 14 which thereby desorbs the collected mercury into chamber 10, whereas simultaneously light source 20 emits a beam of light which passes through chamber 10 and one-half of said light is received by first photo cell 22 after passing through half silver mirror 26 and mercury vapor reservoir 24 and one-half of said light is received by second photo cell 28 after being deflected thereto by half silver mirror 26. First photo cell 22 measures all constituents present in chamber 10 through which the beam of light has passed except mercury vapor being prevented from measuring the mercury vapor by the absorption thereof by the adjacent positioned mercury vapor reservoir 24; whereas, second photo cell 28 measures all constituents in chamber 10 and means 30 measures the absorbence of each cell respectively and calculates the difference which is the amount of mercury vapor present in a given sample or volume of air or gas present in chamber 10.

As the chamber in the apparatus of the present invention various materials may be employed. For example, vycor, pyrex or any other insulating tubing that will not absorb mercury have been found to be suitable chambers. The size of the chamber is not critical and selection thereof will depend on convenience to the user and the environment in which the apparatus is to be utilized. Although it has been found that a chamber of about 4 to about 15 inches in length and 0.25 to about 1.0 inches in diameter is of convenient size, the only requirement for the size of the chamber is that the absorbent surface contained therein be exposed to the total volume of gases or air being passed therethrough. Therefore, it would reasonably be expected that a one foot diameter tube would not be employed with an absorbent material having a small surface area so as to allow passage of a great volume of gas therethrough which would not contact the absorbent. The size of the chamber is selected to give the greatest efficiency of absorption.

Suitable absorbent materials include various resistance wires plated with a noble-metal. Suitable wires include, 20-24 gauge nichrome wire, stainless steel, nickle or a wire of noble-metal itself of suitable thickness. The type and character of wire used in the present apparatus is chosen for its resistance to effect the required heating without the necessity of a large quantity of power to do so. It is preferable to use a nichrome wire plated with a noble-metal such as gold, silver and other noble-metals disclosed in the prior art for use as absorbents.

It has been found that using a plated wire which has been coiled gives a greater surface area for which to contact the gas passing therethrough, therefore increasing the efficiency of the operation. Further, the helical shape creates a spring tension which keeps the coiled wire from coming into contact with itself and the chamber.

It has further been found that a hollow plated wire used herein increases the efficiency of the process by requiring less area to heat therefore requiring less power to do so.

The thickness of the noble-metal coating is not critical because the process of sorption takes place on the surface thereof. The only requirement to give increased efficiency is to utilize as pure a noble-metal coating as is possible to obtain on the wire. Greater thicknesses do not increase the amount of mercury trapped thereon.

A suitable apparatus for employing the improved process would consist of an open ended vycor tube 7.5 inches long and 0.5 inches in diameter containing a 6 to 8 foot, 22 gauge, hollow, helical shaped nichrome wire of 6 ohm resistance having a pure gold plating thereon with said wire being connected to a source of electrical energy, an ultraviolet lamp, two photo cells, a mercury vapor reservoir and a half silver mirror. The resistance of the wire employed can vary greatly depending on the amount of current available to be employed. Therefore, the environment in which the apparatus is to be employed dictates the specific selection of materials of construction. Various environments include airborne and vehicular operations which would have only a certain amount of available power to be utilized in operating the present apparatus.

The power needed to direct resistance heat the absorbent material can be supplied from any conventional power source which is available in the operating environment. It is a requirement that the noble-metal absorbent be heated to a temperature above 450°C. at which time the trapped mercury is released therefrom for the measurement by any suitable means. Thus, the time it takes for heating to the requisite temperature for mercury release will depend on the specific materials of construction selected.

Although preferred embodiments of the invention have been illustrated in the drawings and described herein, in order to provide an example of the practice of the invention, it is to be understood that various changes and innovations can be made in the described apparatus without departing from the spirit and scope of the invention. Innovations and changes of this type are deemed to be encompassed within the spirit and scope of the invention.

Having thus described the invention, we claim:

1. An apparatus for collecting and measuring the amount of mercury vapor present in a volume of gas which comprises in combination:
    a hollow chamber having a means for introducing said gas thereinto at a first end thereof,
    a noble-metal absorbent mounted in said chamber for the absorption of mercury vapor present in gas passed therethrough,
    means for connecting said absorbent to a power source for heating thereof,
    a light source mounted at a second end of said chamber,
    a first photo cell at a first end of said chamber positioned to receive a beam of light emanating from said lamp passing through said chamber,
    a mercury vapor reservoir adjacent said first photo cell and positioned in order that said beam of light emanating from said lamp passing through said chamber passes through said reservoir prior to receipt thereof by said first photo cell,
    a second photo cell at a first end of said chamber positioned to receive a beam of light emanating from said lamp passing through said chamber without passing through said mercury vapor reservoir, and
    means for measuring the absorbence of said first and second photo cells and calculating the differential when said means for heating is activated, and
    means for exiting said gases at a second end of said chamber after said activation and said measurement is completed.

2. The apparatus of claim 1 wherein said noble-metal absorbent is a resistance wire having a noble-metal plating thereon.

3. The apparatus of claim 1 wherein said light source is an ultraviolet lamp.

4. The apparatus of claim 2 wherein the noble-metal plate on said wire is gold.

5. The apparatus of claim 2 wherein said plated wire is helical in shape.

6. The apparatus of claim 5 wherein said plated wire is hollow.

* * * * *